Feb. 5, 1952        J. HOFFMAN ET AL        2,584,584
METHOD OF COOKING AND CANNING MEAT PATTIES
Original Filed April 17, 1947        3 Sheets-Sheet 1
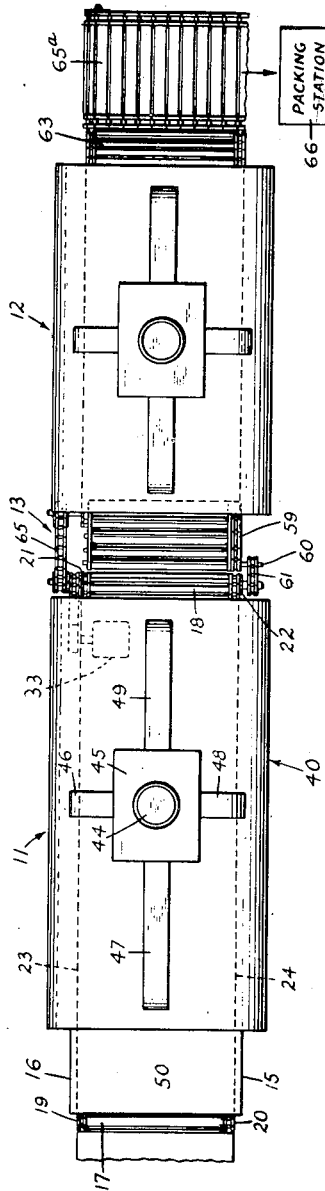
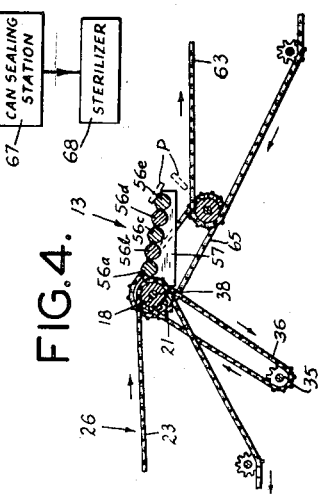
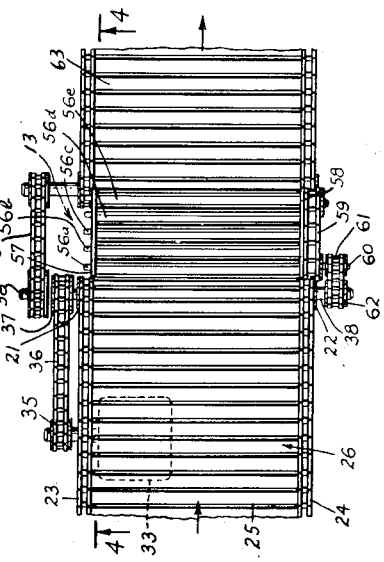
INVENTORS
JULIAN HOFFMAN
ALEXIS GRUFF
BY
Campbell, Brumbaugh & Free
their attorneys.

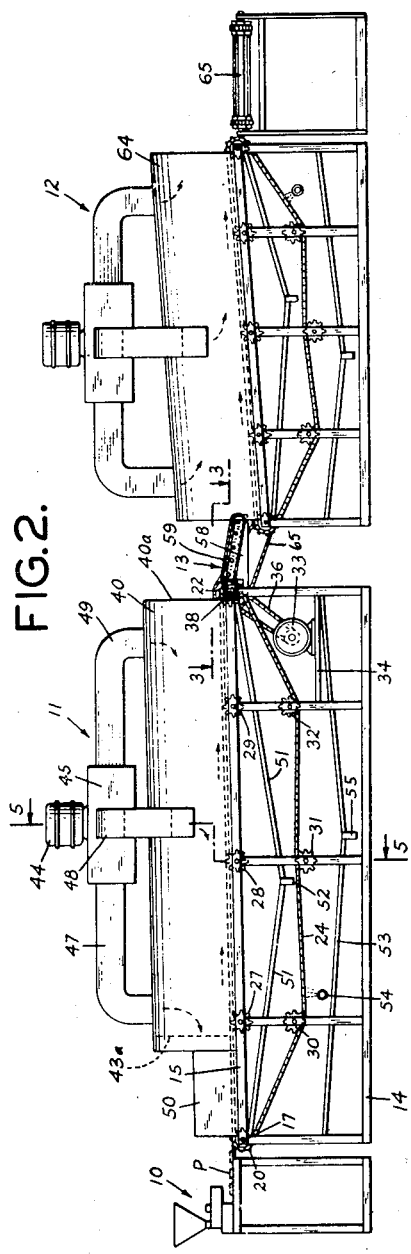
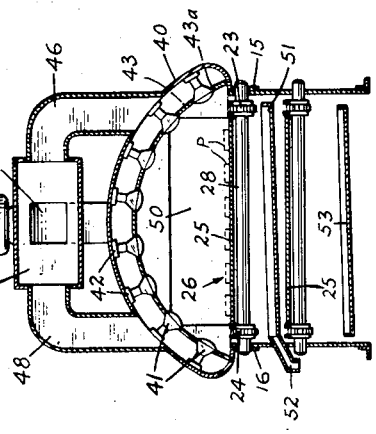
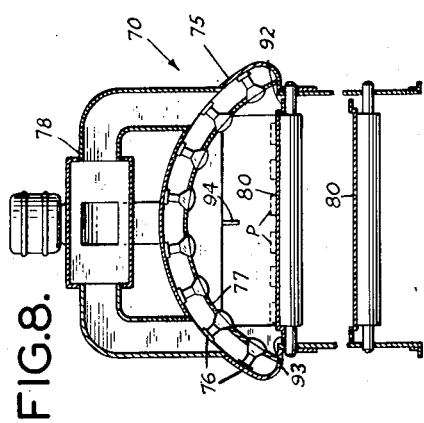

Feb. 5, 1952      J. HOFFMAN ET AL      2,584,584
METHOD OF COOKING AND CANNING MEAT PATTIES
Original Filed April 17, 1947      3 Sheets-Sheet 3
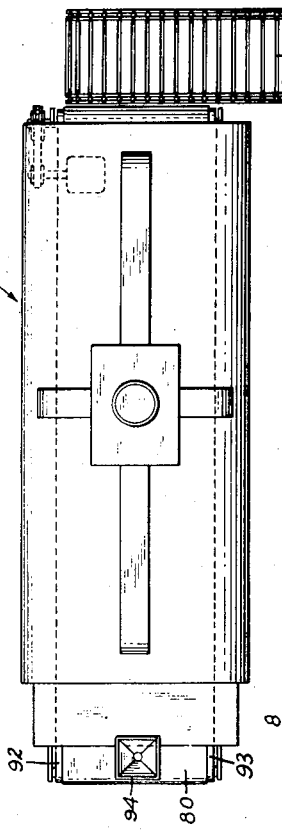
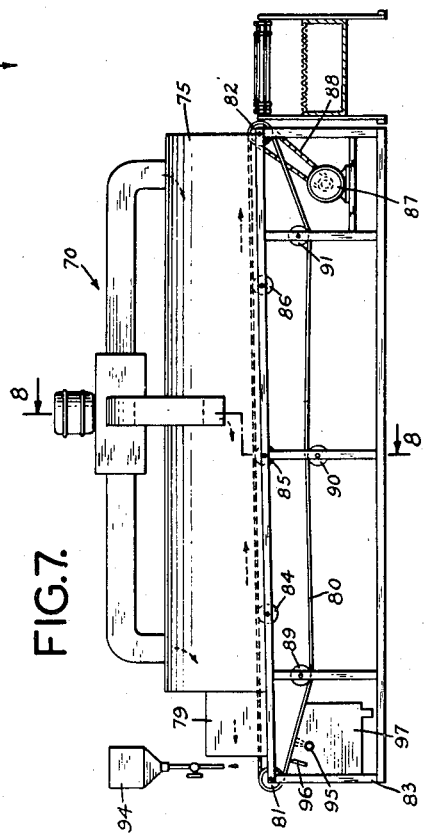
INVENTORS
JULIAN HOFFMAN
ALEXIS GRUFF
BY
Campbell, Brumbaugh + Free
their Attorneys Patented Feb. 5, 1952

2,584,584

UNITED STATES PATENT OFFICE 2,584,584

METHOD OF COOKING AND CANNING MEAT PATTIES

Julian Hoffman, New York, and Alexis Gruff, Flushing, N. Y., assignors to Claridge Food Co. Inc., Murray Hill, N. Y., a corporation of New York Original application April 17, 1947, Serial No. 742,094, now Patent No. 2,529,253, dated November 7, 1950. Divided and this application June 15, 1948, Serial No. 33,016

4 Claims. (Cl. 99—187)

This invention relates to methods for cooking and canning food products, and it relates particularly to methods for cooking, or cooking and canning ground meat patties, such as, for example, hamburgers.

This is a division of our Patent No. 2,529,253, issued November 7, 1950.

Usually, ground meats, because of their relatively poor keeping qualities, are maintained under refrigeration or in frozen form and are cooked immediately before consumption.

We suggested recently that such ground meats could be shaped into patties, cooked in oil, and then canned so that the patties can be readied for consumption merely by heating the contents of the can.

This procedure, while capable of producing such cooked patties in large quantities, is not entirely satisfactory because of certain operating and maintenance problems and because the cooked product is not all that might be desired from the standpoint of appearance and flavor and after taste.

In the prior process, the patties are immersed in a vat of oil heated to a temperature sufficiently high to cook the patties. In their uncooked condition, the patties are rather fragile, and during the cooking operation, small pieces will break off and settle in the oil. These particles are overcooked or burned by the oil and discolor and impart an off flavor to the oil. In a relatively short period of time, it is necessary to completely replace the oil in the vat with fresh oil even when the oil is filtered and clarified during the cooking operation and before the start of each run with the apparatus. The replacement of the oil is expensive inasmuch as many gallons of oil must be used in a vat of a sufficient size to handle a substantial number of patties during a day's run.

The above-described process has other characteristics that are not particularly desirable, for example, it is impossible to prevent the odor of the heated cooking oil from permeating the atmosphere throughout a very substantial area, and therefore such a cooking installation is not desirable in any populated area.

Also, it is difficult to control the cooking of the patties when using heated cooking oil. Variations in the temperature of the oil will alter the cooking of the patties. Moreover, when the machine is stopped, for example, in case of a breakdown or other delay, some of the patties are cooked for a longer period of time than others. Therefore, while some of the patties are cooked properly, there is always the possibility that a substantial proportion may be overcooked or undercooked.

Another undesirable feature is that the oil used in the cooking operation tends to penetrate into the patties with the result that the digestibility of the patties is not as good as might be desired. Also, the nutritious meat juices which are exuded from the patties during the cooking operation are lost in the cooking oil and must be discarded with the result that a valuable by-product, useful in the manufacture of soap, for example, is lost.

Another disadvantage from the standpoint of production is that when the cooking device is shut down over night or when fresh oil is used, it is necessary to heat the oil, an operation requiring one to two hours. Inasmuch as the cooking operation is not continuous, several hours are lost before the cooking system can be conditioned for operation.

An object of the present invention is to provide a method for cooking ground meat patties which overcomes the disadvantages of the process and apparatus referred to above.

Another object of the invention is to provide a method for producing cooked and canned meat patties in which the patties are broiled, rather than fried.

Another object of the invention is to provide methods whereby the patties may be cooked in large quantities without diminishing the digestibility of the product and which produces a product as palatable as freshly cooked products.

Another object of the invention is to provide a process for preparing meat patties for canning which eliminates odors and which complies fully with any and all sanitary codes.

A further object of the invention is to provide a process of preparing meat patties for canning which does not involve the use of cooking fats and by means of which a product of better flavor and appearance, and more uniform characteristics, can be produced.

Other objects of the invention become apparent from the following description of typical methods and apparatus for practising the present invention.

In accordance with the present invention, we have provided a method wherein freshly prepared meat patties are subjected to radiant heat, produced, for example, by infra-red lamps for a sufficient period of time to broil them exactly to the desired state which makes them most suitable for canning. The patties preferably are not cooked completely through so that the subsequent canning and sterilizing operation will complete the cooking of the meat patties and render them ready for consumption merely upon reheating.

A suitable apparatus for practising the invention may include a first conveyor and heating chamber wherein the patty is raised from its chilled or refrigerated state to a temperature sufficiently high to cook the patty almost halfway through during the period that it is in the cooking chamber. Thereafter, the partially broiled patty is inverted and carried along on another conveyor through another heating chamber wherein the broiling of the meat patty is substantially completed, preferably leaving only a small part of the center of the patty incompletely cooked. The patties may then be transferred to a canning station where they are introduced into cans with a suitable sauce, the cans are sealed and subjected to sterilizing temperatures which not only sterilizes the meat in the can but also completes the cooking of the patties and blends meat juices exuded from the patties with the sauce.

The apparatus for practicing the invention may include an air circulating system whereby the seats and sockets of the infra-red lamps may be cooled to prolong their lives. The air heated by passing around the lamps may be used to pre-heat the refrigerated patties and thereby bring them more quickly and economically up to cooking temperature.

The apparatus may also include suitable means for collecting the juices cooked from the patties, and these juices may either be used in the preparation of sauces for the patties or may be clarified and used as a by-product for the manufacture of soap and other materials.

In a modified form of apparatus, the patties may be cooked on a highly polished metal belt which has such reflecting power that the patties may be broiled uniformly and simultaneously from above and below, by reflection, or by lamps or by other heating elements placed beneath the belt so that it is unnecessary to invert or turn over the patties during the cooking operation.

Meat patties, such as, for example, hamburgers, produced in accordance with the invention, are free from any substantial amount of oil foreign to the meat and are in the condition normally produced by broiling the hamburger. The absence of cooking oil improves the digestibility of the product and eliminates foreign odors and flavors in the product. Moreover, the product is more uniform for the reason that all of the patties are cooked equally to just the proper condition for serving after they have been heated.

For a better understanding of the present invention, reference may be had to the accompanying drawing in which:

Figure 1 is a plan view of one form of cooking apparatus embodying the present invention;

Figure 2 is a view in side elevation of the cooking apparatus shown partly broken away;

Figure 3 is a view in section taken on line 3—3 of Figure 2;

Figure 4 is a view in section taken on line 4—4 of Figure 3 with the frame of the device omitted to disclose more clearly the drive mechanism for the apparatus;

Figure 5 is a view in section taken on line 5—5 of Figure 2;

Figure 6 is a plan view of a modified form of cooking apparatus;

Figure 7 is a view in side elevation of the apparatus shown in Figure 6; and

Figure 8 is a view in section taken on line 8—8 of Figure 7.

A typical apparatus which may be used for practising the method embodying the invention, may include a conventional type of mechanically operated patty-forming device 10 by means of which the ground meat, chilled to a temperature of about 40° F. or less, is converted into generally disc-like patties P. These patties are conveyed through the cooking apparatus, which includes a first cooking unit 11 for cooking one side of the patty and a second cooking unit 12 for cooking the other side of the patty. In order to cook both sides of the patty substantially equally, the patties may be inverted by means of a turnover or inverting device 13.

The first cooking unit 11 includes a suitable framework 14, which may be formed of angle irons or any other desired type of material and is of generally open box-like structure having longitudinally extending top rails 15 and 16. At opposite ends of the top rails are mounted the rollers 17 and 18 which, as shown in Figure 1, are provided with sprockets 19 and 20 and 21 and 22, respectively. The sprockets 19 and 21 carry a chain member 23, and the sprockets 20 and 22 carry a chain member 24. Each link of the chain 23 is connected to a link of the chain 24 by means of a metal slat 25 so that the chains 23 and 24 form the edges of an endless, articulated metal conveyor 26 extending lengthwise of the frame 14.

The upper flight of the conveyor 26 may be supported by a series of shafts and sprockets 27, 28 and 29, extending transversely between the top rails 15 and 16. It will be understood, of course, that other supporting members may be provided between the various supporting rollers so as to maintain the surface of the upper flight of the conveyor 26 substantially flat, for example, the chains 23 and 24 may slide upon the upper edges of the top rails 15 and 16.

The lower flight of the conveyor 26 is supported by means of a plurality of sprockets 30, 31 and 32, extending across the frame 14 and suitably journalled in the uprights thereof.

The conveyor 26 may be driven by means of a motor 33 which is supported on a platform 34 within the frame 14 and is provided with a sprocket 35 which is connected by means of a chain 36 to a sprocket 37 on the end of the shaft 38 which supports the roller 18. Preferably, a reduction gear, not shown, is interposed between the motor 33 and the chain drive mechanism so that the upper flight of the conveyor moves slowly to the right, as viewed in Figures 1, 2 and 3.

The cooking unit 11 also includes a hood 40, which may have any desired shape but preferably is semi-cylindrical or parabolic in transverse cross section, as shown in Figure 5, having a downwardly extending rear end 40a spaced slightly from the upper flight of the conveyor 26. The hood overlies the conveyor 26 and is supported by the side frame members 15 and 16 so as to provide a space for reception of a plurality of infra-red lamps 41. The lamps 41 are supported detachably in sockets 42, which are mounted in the interior of the hood 40 so that the lamps 41 can be replaced when they burn out.

The lamps are exposed to the conveyor through openings 43a in an inner shell and reflector member 43 which is substantially concentric with the hood 40 and lies substantially at the widest dimension of the lamps 41. The reflector 43 may be provided with a highly polished surface in order to render the lamps more efficient and to conserve heat during the cooking operation.

Inasmuch as the lamps 41 generate a great deal of heat, the bases of the lamps and the sockets 42 tend to become overheated. In order to prolong the life of the lamps and prevent damage to the sockets 42 by such overheating, the cooking unit 11 may be provided with a blower unit 44 including a fan and a motor which draws air into a manifold 45 mounted above and preferably supported on the hood 40. The manifold 45 is provided with a plurality of ducts 46, 47, 48 and 49 which communicate with the space between the hood 40 and reflector 43 to deliver cool air around the bases of the lamps 41 and the sockets 42. The lefthand end 43a of the reflector 43, as shown by the dotted line in Figure 2, terminate short of the end of the hood 40 so that the air heated by passing around the lamps 41 and the sockets 42 is discharged into the small prewarming hood 50 near the feed end of the machine. The hood 50 is directly connected to the hood 40 so that the air from the space between the reflector 43 and the hood 40 passes through the prewarming hood 50 into contact with the patties entering the cooking device. The heat of the air is sufficient to raise the temperature of the patties from about 40° F. to around 75 to 80° F. before the patties enter the cooking chamber. If desired, some of the heated air may be recirculated to the blower to conserve the heat therein and to temper the air for cooling the lamps 41.

The length of the cooking chamber 40 is such that when the conveyor 26 is driven at a predetermined speed, the patties are cooked only part way through, preferably less than halfway through. As the cooking progresses, the fat and other juices in the meat tend to cook out, and because of the slat-like structure of the conveyor 26, it can drip through the upper flight of the conveyor where it is collected in the drip pans 51 extending beneath the upper flight of the conveyor and converging downwardly toward the center of the machine, where it is discharged through the spout 52 (Figures 2 and 5) and is collected for use in preparing a suitable sauce for the cooked meat patties P or for any other purpose. A second drip pan 53 may be mounted below the conveyor so that hot water directed onto the surface of the conveyor through the nozzles or jets 54 may be collected and carried away through the drain 55.

When the partially cooked patties reach the right-hand end of the cooking unit 11, they are transferred to the turnover or inverting device 13 which consists of a series of rollers 56a, 56b, 56c, 56d, and 56e all rotatably mounted in side plates 57 and 58 extending from the right-hand end of the frame 14. The rollers 56a to 56e are provided with sprockets which are connected by means of a chain 59. The roller 56a, as viewed in Figure 3, has an extension shaft 60 thereon, which is provided with a sprocket connected by means of the chain 61 to a sprocket 62 on the shaft 38. Therefore, the rollers 56a to 56e rotate and advance the patties, as shown in Figure 4, and drop them in an inverted position onto the conveyor 63 of the cooking unit 12.

The cooking unit 12 is similar to the cooking unit 11, with the exception that it does not include the preheating chamber 50 and it is not as long as the heating unit 11 for the reason that the meat patties have been raised very substantially in temperature even at the uncooked portions by their passage through the cooking unit 11 and do not require as long a period for completing their cooking. The same result can be obtained, however, by making the cooking chamber 64 the same length as the chamber 40 and driving the conveyor 63 faster than the conveyor 26 by means of the sprocket and chain drive 65 from the shaft 38 to the conveyor 63.

Another difference between the unit 12 and the unit 11 is that the space between the outer shell 64 of the cooking unit 12 and the reflector, not shown, is arranged so that the heated air is discharged out the right-hand end of the cooking unit 12.

During the passage of the patties P through the cooking unit 12, they are almost, but not quite, completely cooked. Preferably, the mid portions of the patties are slightly underdone.

After passing through the cooking unit 12, the patties P are discharged to another slat-like conveyor 65a arranged at a right angle to the conveyor 63 and which is driven by a motor (not shown) to deliver the patties to the packing station 66 where they are transferred to cans, and the cans are sealed at can-sealing station 67. The sealed cans are then delivered to the sterilizer 68. The packing, can-sealing and sterilizing equipment are illustrated diagrammatically inasmuch as they are conventional.

At the packing station or before sealing the cans, a suitable sauce, such as, for example, a tomato sauce or a mushroom sauce, may be introduced into the cans. This sauce is cooked and blends with the juices cooked from the meat patties during the sterilizing operation where the cooking of the patties is completed by the high sterilizing temperature.

The canned product thus is completely cooked, its flavor has not deteriorated due to contact with any other material, such as cooking oil, which might impart off flavors to the product, and the appearance of the final product is like that of freshly prepared meat patties of the same type.

The above-described apparatus permits a very close control over the cooking temperature and time of cooking with little damage to the patties, so that the uniformly sized, and uniformly cooked patties are produced.

The apparatus used in the process is susceptible to considerable variation, and if desired, the operation can be conducted in a single cooking unit, as best shown in Figures 6 to 8. This cooking unit 70 includes a hood 75, similar to the hood 40 described above in that it is provided with a plurality of infra-red lamps 76, a reflector 77 spaced within the hood 75 and the mechanism 78 for circulating air around the lamps 76 to cool them. Also, the hood may be provided with a preheating chamber 79 for warming the refrigerated meat products. The principal difference between this device and the cooking unit disclosed in Figures 1 to 5 consists in the provision of a high polished continuous metal conveyor belt 80, preferably formed of stainless steel. The conveyor belt 80 is supported on the rollers 81 and 82 at opposite ends of the frame 83 and is supported at intermediate zones on idler rollers 84, 85 and 86 also journalled in the frame. The roller 82 may be driven by means of an electric motor 87 and a chain drive 88 so as to cause the upper flight of the conveyor to move from left to right, as viewed in Figures 6 and 7. The lower flight of the conveyor 80 is supported by means of other idler rollers 89, 90 and 91 also mounted in the frame 83.

The advantage of the use of a continuous polished conveyor belt is that the radiant energy from the infra-red lamps 76 is reflected from and conducted by the conveyor 80 to the underside of the patties so that the underside is cooked substantially as quickly as the top side of the patties during their passage through the cooking unit 70. Inasmuch as the conveyor belt 80 is imperforate, the juices and fats cooked from the meat patties cannot leak through the conveyor belt and must drain off the edges of the belt. The frame is provided with troughs 92 and 93 along the edges of the belt 80, best shown in Figure 6, into which these juices drain.

Also, in order to prevent the meat from sticking to the conveyor belt 80, the device may be provided with a tank 94 for receiving a cooking fat which is atomized or dropped in very small quantities on the surface of the conveyor belt before the patties are deposited on the belt.

The conveyor belt 80 may be cleaned by spraying hot water against it by means of the transversely extending nozzle 95. The excess water may be removed by means of a squeegee or doctor blade 96 carried on the frame. A suitable sump 97 is mounted in the frame to enclose the washing nozzle 95 and the doctor blade and to collect the water used in the cleaning operation.

From the preceding description of the operations involved in the cooking method, it will be apparent that we have provided a method which is capable of overcoming the deficiencies of prior cooking and canning methods and are, for that reason, able to produce products of high quality, both from a standpoint of appearance and flavor with a considerable saving in the cost of production. The devices described above are economical to operate and may be maintained completely sanitary without substantial difficulty. They are flexible in operation and can be shut down and returned to operation with a minimum of loss of time. A particular advantage is the close control over cooking temperatures and times that may be obtained therewith. Thus, when the cooking properties of the meat vary, the conveyors can be speeded up or slowed down to compensate for such variations, and therefore products that are cooked uniformly can be obtained at all times.

It will be understood that the devices are susceptible to considerable modification, as indicated by the two illustrative examples of the apparatus, and therefore, these modifications should be considered as illustrative only and not as limiting the scope of the following claims.

We claim:
1. A method of cooking and canning ground meat patties which comprises forming ground meat into patties, directing infra-red radiations against one side of said meat patties until said patties are cooked almost halfway through to render the patties firm and capable of being handled without disintegrating, inverting said patties and directing infra-red radiations against the other side of the patties until the patties are cooked almost completely through, placing said patties in cans, sealing said cans and heating said cans to sterilize said patties and completely cook them.

2. A method of cooking and canning ground meat patties which comprises forming ground meat into patties, directing infra-red radiations against opposite sides of said patties to cook said patties almost completely, placing said patties in cans, sealing said cans and heating said cans to sterilize and complete the cooking of said patties.

3. A method of cooking and canning ground meat patties which comprises forming ground meat into patties, directing infra-red radiations against opposite sides of said patties to cook said patties almost completely, making a sauce from the juices cooked from said patties placing said patties in cans, introducing said sauce into said cans, sealing said cans and heating said cans to sterilize and completely cook said patties.

4. A method of cooking and canning ground meat patties which comprises forming ground meat into patties, directing infra-red radiant energy against one side of ground meat patties, reflecting radiant energy against the opposite side of said patties to heat said patties from both sides and cook them almost completely, placing said almost completely cooked patties in cans, sealing said cans, and heating said cans sufficiently to sterilize the patties and completely cook them.

JULIAN HOFFMAN.
ALEXIS GRUFF.

REFERENCES CITED

The following references are of record in the file of this patent:

UNITED STATES PATENTS

| Number | Name | Date |
| --- | --- | --- |
| 2,057,421 | Dickson | Oct. 13, 1936 |
| 2,144,182 | Ellis | Jan. 17, 1939 |
| 2,199,584 | Bemis | May 7, 1940 |
| 2,292,255 | Weisberg | Aug. 4, 1942 |
| 2,340,354 | Wells | Feb. 1, 1944 |
| 2,366,169 | Barth | Jan. 2, 1945 |
| 2,377,873 | Finizie | June 12, 1945 |